United States Patent
Ayleni et al.

(10) Patent No.: US 9,198,088 B2
(45) Date of Patent: Nov. 24, 2015

(54) METHOD AND APPARATUS FOR AN OPTIMIZED SEARCH FOR SERVICE WHEN A MULTI-MODE UE GOES OUT OF SERVICE

(71) Applicant: QUALCOMM Incorporated, San Diego, CA (US)

(72) Inventors: Preethi Ayleni, Hyderabad (IN); Mahender Reddy Akkapally, Hyderabad (IL); Venugopal Krishna Srinivasa Srungaram, Hyderbad (IN); Harinath Reddy Patel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/198,387

(22) Filed: Mar. 5, 2014

(65) Prior Publication Data

US 2015/0004966 A1    Jan. 1, 2015

Related U.S. Application Data

(60) Provisional application No. 61/839,660, filed on Jun. 26, 2013.

(51) Int. Cl.
*H04W 4/00*    (2009.01)
*H04W 36/00*    (2009.01)
(Continued)

(52) U.S. Cl.
CPC .......... *H04W 36/0005* (2013.01); *H04W 48/16* (2013.01); *H04W 48/18* (2013.01); *H04W 60/00* (2013.01); *H04W 88/06* (2013.01)

(58) Field of Classification Search
CPC ..... H04W 60/00; H04W 88/06; H04W 48/18; H04W 48/16; H04W 36/0005

USPC .................... 455/432.1, 433, 434, 435.2, 445
See application file for complete search history.

(56) References Cited

U.S. PATENT DOCUMENTS 7,197,312 B2 * 3/2007 Gunaratnam ......... H04W 48/18
                                                    455/412.2
8,761,138 B2 * 6/2014 Moisanen ......... H04W 36/0022
                                                    370/328
(Continued)

FOREIGN PATENT DOCUMENTS

GB          2434508 A  *  7/2007 ............... H04Q 7/38
WO  WO-2007/086679 A1   8/2007

OTHER PUBLICATIONS

3GPP TS 22.234 V11.0.0 (Sep. 2012).*
(Continued)

*Primary Examiner* — William Nealon
(74) *Attorney, Agent, or Firm* — Arent Fox LLP

(57) ABSTRACT

The present disclosure presents a method and an apparatus for searching for service when a multi-mode UE goes out of service (OOS). For example, the disclosure presents a method for receiving a request to scan frequencies of a RPLMN of a first RAT and scanning the frequencies of the first RAT based on an acquisition database (ACQ DB). In addition, such an example method, may include sending an available PLMN list to the NAS layer, switching to a second RAT based on a request from the NAS layer, scanning frequencies of the second RAT based on the ACQ DB, and camping on a frequency of the second RAT found during the scanning of the frequencies of the second RAT based on the ACQ DB. As such, a method and an apparatus for searching for service when a multi-mode UE goes OOS may be achieved.

30 Claims, 7 Drawing Sheets

(51) Int. Cl.
*H04W 60/00* (2009.01)
*H04W 48/16* (2009.01)
*H04W 48/18* (2009.01)
*H04W 88/06* (2009.01)

(56) References Cited

U.S. PATENT DOCUMENTS

| | | | |
|---|---|---|---|
| 2007/0042775 A1 | 2/2007 | Umatt et al. | |
| 2008/0153486 A1* | 6/2008 | Ramkull | H04W 48/18 455/434 |
| 2010/0113020 A1* | 5/2010 | Subramanian | H04W 48/18 455/435.2 |
| 2010/0167738 A1* | 7/2010 | Kim | H04W 48/16 455/435.2 |
| 2011/0177810 A1* | 7/2011 | Kim | H04W 48/18 455/432.1 |
| 2013/0130678 A1* | 5/2013 | Zanier | H04W 8/065 455/433 |
| 2013/0196663 A1 | 8/2013 | Yurkevich et al. | |
| 2013/0203410 A1* | 8/2013 | Gandhi | H04W 48/16 455/434 |
| 2013/0225164 A1 | 8/2013 | Buckley et al. | |
| 2013/0237223 A1 | 9/2013 | Hietalahti et al. | |
| 2013/0310047 A1 | 11/2013 | Aoyagi et al. | |

OTHER PUBLICATIONS

3GPP TS 23.122 V12.0.0 (Mar. 2013).*
3GPP TS 24.301 V12.0.0 (Mar. 2013).*
NSW-060005 Out of service in 3G Idle mode and Ping Pong, 3gpp TSG Workshop, Jan. 2006.*
3GPP Draft, "Out of service in 3G Idle mode and Ping Pong", NSW-060005, 3rd Generation Partnership Project (3GPP), Mobile Competence Centre, France, no. Amsterdam, the Netherlands, chapters 2.1 and 3.1, 20060124, Jan. 17, 2006, XP050440821.
3GPP Standard; 3GPP TR 22.811, "3rd Generation Partnership Project, Technical Specification Group Services and Systems Aspects; Review of Network Selection Principles; (Release 7)", 3rd Generation Partnership Project (3GPP), Mobile Competence Centre, 650, Route Des Lucioles, F-06921 Sophia-Antipolis Cedex, France, No. V1.0.0, Jun. 1, 2005, pp. 1-16, XP050361363, chapter 6.7.
International Search Report and Written Opinion—PCT/US2014/043559—ISA/EPO—Oct. 17, 2014. (13 total pages).

* cited by examiner

METHOD AND APPARATUS FOR AN OPTIMIZED SEARCH FOR SERVICE WHEN A MULTI-MODE UE GOES OUT OF SERVICE

CLAIM OF PRIORITY UNDER 35 U.S.C. §119

The present application for patent claims priority to U.S. Provisional Patent Application No. 61/839,660, filed Jun. 26, 2013, entitled "Method and Apparatus for Scanning for Service at a Multi-mode User Equipment After Being Out-of-Service," which is assigned to the assignee hereof, and hereby expressly incorporated by reference herein.

BACKGROUND

Aspects of the present disclosure relate generally to wireless communications and, more particularly, to a method and an apparatus for searching for service when a multi-mode user equipment (UE) goes out of service (OOS).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

A public land mobile network (PLMN) is a network that is operated by an administrator or a recognized operating agency (ROA) (which may both be referred to as an "operator") for the specific purpose of providing land and/or mobile telecommunication services to the public. A PLMN is identified by PLMN identifier (PLMN ID) which includes a Mobile Country Code (MCC) and a Mobile Network Code (MNC). Each operator providing mobile services has its own PLMN identifier. PLMNs interconnect with other PLMNs and Public switched telephone networks (PSTN) for telephone communications and/or with Internet service providers for data and Internet. Access to PLMN services may be achieved via an air interface involving radio communications between mobile phones and/or other wireless-enabled user equipment (UE) and land-based radio transmitters, radio base stations, and/or fiber optic networks.

A subscriber to wireless services may be associated with a subscriber profile. The subscriber's profile may be stored in association with a home public land mobile network (HPLMN), which simply may be a PLMN associated with a wireless service to which the subscriber has a relationship and/or subscription. If the subscriber roams to another PLMN by, for example, leaving a geographic area associated with the subscriber's HPLMN, the subscriber may still receive subscription information from its HPLMN even though the subscriber may now be receiving service from a visited public land mobile network (VPLMN). A HPLMN for one subscriber may be a VPLMN for another subscriber.

When a multi-mode UE, e.g., a UE that is capable of operating across different standards and radio access technologies (RAT), goes out-of-service (OOS), the Non-Access Stratum (NAS) layer of the UE sends a service request to a radio resource on the UE to search for service on a PLMN from which the UE was most recently receiving service. The most recent PLMN may be referred to as the registered PLMN or RPLMN. The RPLMN may be the HPLMN or a VPLMN. When the UE is operating in UMTS or LTE, the radio resource may be referred to as a radio resource control (RRC) and when the UE is operating in GSM, the radio resource may be referred to as RR.

The UE may search for service on a RAT-by-RAT basis. First, the UE may perform a scan of a first RAT associated with the RPLMN. If a signal on which service may be acquired is found, the UE may attempt to camp on the signal and register with the RPLMN. If not, the UE may scan in the current RAT (associated with the RPLMN) according to an acquisition database (ACQ DB). The ACQ DB includes information related to frequencies on which the UE is most likely to find a signal where service may be acquired within each PLMN that is accessible by the UE for each RAT supported by each PLMN. More particularly, the ACQ DB may include a list of frequencies that are each associated with a PLMN identifier and a RAT identifier.

If the UE finds an acceptable signal on the first RAT associated with the RPLMN as a result of the scanning frequencies identified within the ACQ DB, which may be referred to as an ACQ DB scan, the UE may attempt to register with the RPLMN. If no such signal is found, the UE may perform a full band scan for the first RAT associated with the RPLMN. If the UE finds an acceptable signal while scanning the full band, the UE may attempt to register with the RPLMN. If the UE has not been able to register with the RPLMN upon completion of the ACQ DB and full band scans of each RAT associated with the RPLMN, the UE may provide a list of all available PLMNs to the Non-Access Stratum (NAS).

It is often the case that a UE may find service in a RAT associated with a PLMN at the frequencies corresponding to the RAT and the PLMN within the ACQ DB. In other words, the ACQ DB may include PLMN-RAT-frequency combination information that indicates the most promising candidates for camping and registration. However, the current techniques perform an ACQ DB scan and then a full band scan for a first RAT before performing ACQ DB scans and then a full band scan for the next RAT. As such, the UE may spend a large amount of time performing a large number of scans in order to acquire service. As a result, there may be an undesirable delay in the UE acquiring service.

As such, an optimized search for service when a multi-mode UE goes out of service (OOS) is desired.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and an apparatus for searching for service when a multi-mode user equipment (UE) goes out of service (OOS). For example, the present disclosure presents an example method for receiving a request at the UE, from a non-access stratum (NAS) layer, to scan one or more frequencies of a registered public land mobile network (RPLMN) associated with a first radio access technology (RAT), wherein the first RAT is a last camped RAT of the UE, scanning the one or more frequencies of the first RAT based on an acquisition database (ACQ DB), and sending an available PLMN list to the NAS layer in response to determining that the RPLMN is not found during the scanning of the first RAT based on the ACQ DB. The example method further comprises switching to a second RAT based on a request from the NAS layer in response to identifying that a Home PLMN (HPLMN) is not in the available PLMN list, scanning one or more frequencies of the second RAT based on the acquisition database (ACQ DB), and camping on a frequency of the second RAT found during the scanning of the one or more frequencies of the second RAT based on the ACQ DB.

In an additional aspect, an apparatus for searching for service when a multi-mode user equipment (UE) goes out of service (OOS) is disclosed. The apparatus may include means for receiving a request at the UE, from a non-access stratum (NAS) layer, to scan one or more frequencies of a registered public land mobile network (RPLMN) associated with a first radio access technology (RAT), wherein the first RAT is a last camped RAT of the UE, means for scanning the one or more frequencies of the first RAT based on an acquisition database (ACQ DB), means for sending an available PLMN list to the NAS layer in response to determining that the RPLMN is not found during the scanning of the first RAT based on the ACQ DB. The apparatus further comprises means for switching to a second RAT based on a request from the NAS layer in response to identifying that a Home PLMN (HPLMN) is not in the available PLMN list, means for scanning one or more frequencies of the second RAT based on the acquisition database (ACQ DB), and means for camping on a frequency of the second RAT found during the scanning of the one or more frequencies of the second RAT based on the ACQ DB.

In a further aspect, a non-transitory computer readable medium for searching for service when a multi-mode user equipment (UE) goes out of service (OOS) is described. The non-transitory computer readable medium comprises code that, when executed by a processor or processing system included within a user equipment, causes the user equipment to receive a request at the UE, from a non-access stratum (NAS) layer, to scan one or more frequencies of a registered public land mobile network (RPLMN) associated with a first radio access technology (RAT), wherein the first RAT is a last camped RAT of the UE, scan the one or more frequencies of the first RAT based on an acquisition database (ACQ DB), send an available PLMN list to the NAS layer in response to determining that the RPLMN is not found during the scanning of the first RAT based on the ACQ DB. The non-transitory computer readable medium further causes the user equipment to switch to a second RAT based on a request from the NAS layer in response to identifying that a Home PLMN (HPLMN) is not in the available PLMN list, scan one or more frequencies of the second RAT based on the acquisition database (ACQ DB), and camp on a frequency of the second RAT found during the scanning of the one or more frequencies of the second RAT based on the ACQ DB.

Moreover, the present disclosure presents an apparatus for searching for service when a multi-mode user equipment (UE) goes out of service (OOS). The apparatus may include a service determiner module configured to receive a request at the UE, from a non-access stratum (NAS) layer, to scan one or more frequencies of a registered public land mobile network (RPLMN) associated with a first radio access technology (RAT), wherein the first RAT is a last camped RAT of the UE, a scanning module configured to scan the one or more frequencies of the first RAT based on an acquisition database (ACQ DB), and a camping and registration module to send an available PLMN list to the NAS layer in response to determining that the RPLMN is not found during the scanning of the first RAT based on the ACQ DB. The apparatus further comprises the scanning module further configured to switch the UE to a second RAT based on a request from the NAS layer in response to identifying that a Home PLMN (HPLMN) is not in the available PLMN list, the scanning module further configured to scan one or more frequencies of the second RAT based on the acquisition database (ACQ DB), and the camping and registration module further configured to camp on a frequency of the second RAT found during the scanning of the one or more frequencies of the second RAT based on the ACQ DB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A new behavior for scanning for service at a multi-mode user equipment (UE) after being out-of-service (OOS) is described. According to the present aspects, rather than performing an ACQ DB scan, followed by a full band scan, for each supported RAT, a UE may first perform an ACQ DB scan on a RAT-by-RAT basis. The UE then may resort to a full band scan for one or more RATs (or all supported RATs) once all of the ACQ DB scans for each RAT are complete.

Figure 1:
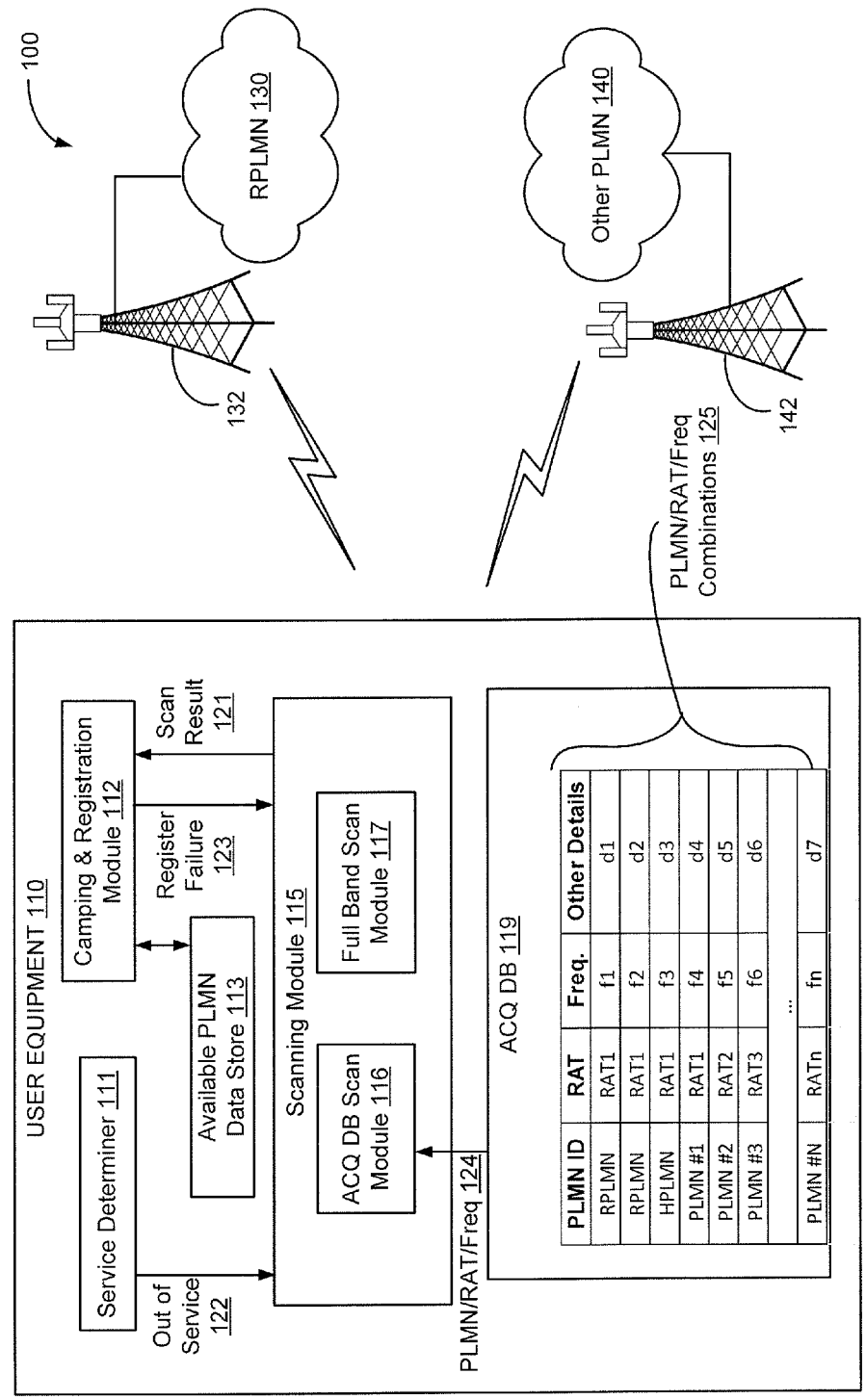
FIG. 1 is a block diagram illustrating an example of a wireless communication system in which a multi-mode user equipment (UE) configured to scan for service after being out-of-service, according to the described aspects, is in communication with at least two base stations, each of which is associated with a public land mobile network (PLMN)

Referring to FIG. 1, a wireless communication system 100 includes a user equipment (UE) 110 in communication with base station 132 associated with a registered public land mobile network (RPLMN) 130 and base station 142 associated with a public land mobile network (PLMN) 140, which is a PLMN other than RPLMN 130. Although, only two base stations are shown in FIG. 1, it will be appreciated that UE 110 may be in communication with any number of base stations associated with any number of PLMNs at the same time or at different times. Furthermore, and in an aspect, UE 110 may be a multi-mode UE and, as such, may be in communication with at least base station 132 and base station 142 using one or more radio access technologies (RATs), including, in a non-liming example, for example, UMTS, GSM, LTE, or the like, and/or according to any number of wireless communication standards.

In an aspect, UE 110 also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, base station 132 and/or base station 142, which also may be referred to as an access point or node, may be a macro cell, pico cell, small cell, relay, Node B, eNodeB, mobile Node B or substantially any type of component that can communicate with UE 110 to provide wireless network access.

In an aspect, UE 110 includes Service Determiner 111, which may be configured to determine that the UE 110 is currently in an out-of-service (OOS) state as a result of detecting that UE 110 was recently powered on and/or is otherwise without service. If so, then Service Determiner 111 may communicate an out of service or no service indication 122 to scanning module 115 in order to request performing a scan for service. In an additional aspect, Service Determiner 111 may also be configured to determine a PLMN to which UE 110 was most recently registered, e.g., RPLMN 130 and/or a RAT on which the UE 110 was most recently camped. In an aspect, the identity of RPLMN 130 and the identity of the most recent RAT may be communicated to scanning module 115 as part of the out of service indication 122. In an additional aspect, the identity of RPLMN 130 and the identity of the most recent RAT may be determined by another component or components and communicated to scanning module 115 in some other fashion.

In an aspect, UE 110 includes scanning module 115 configured to scan for service at UE 110. Scanning module 115 may be configured to receive the out of service indication 122 from Service Determiner 111, which may, in an aspect, include identity of RPLMN 130 and identity of the most recent RAT. In response, scanning module 115 may be configured to activate an acquisition database (ACQ DB) scan module 116 to begin scanning at a first frequency associated with the most recent RAT and/or RPLMN 130. To do so, ACQ DB scan module 116 may be configured to communicate with ACQ DB 119 to retrieve a first frequency, which may be communicated as one or more PLMN-RAT-frequency combinations 124. From the PLMN-RAT-frequency combination(s) 124, ACQ DB scan module 116 may be configured to select the first frequency for scanning associated with the most recent RAT and the RPLMN based on, for example, a priority system, a predetermined order, a dynamically changeable order, a user-defined order, and/or any other method.

In an aspect, UE 110 includes ACQ DB 119, which may be a data store, memory, or some other component suitable for storing data, configured to store information related to PLMN-RAT-frequency combinations 125 that are most likely to yield service acquisition for UE 110. In an aspect, the PLMN-RAT-frequency combinations 125 within ACQ DB 119 may be preconfigured by one or more users of UE 110, one or more wireless service providers associated with UE 110, a manufacturer of UE 110, a network operator, or the like. In an aspect, the PLMN-RAT-frequency combinations 125 within ACQ DB 119 may be dynamically adjusted, updated, and/or changed by one or more users of UE 110, one or more wireless service providers associated with UE 110, a manufacturer of UE 110, a network operator, or the like.

In an aspect, ACQ DB 119 includes PLMN-RAT-frequency combinations 125 as a chart, list, or other correlated data format, which includes entries. An entry may include a PLMN identifier (ID), which may be, for example, an indication of a wireless service provider associated with a PLMN (e.g., Wireless Carrier A, Wireless Carrier B, or the like) and/or an indication as to whether a PLMN is the Registered PLMN (RPLMN), a home PLMN (HPLMN) with which UE 110 is associated, or a visited PLMN (VPLMN). An entry also may include a RAT, which may be, for example, GSM, UMTS, LTE, or the like, a frequency, which may be listed in megahertz (MHz), and additional information or other details related to the PLMN-RAT-frequency combination of the particular entry. The other details for each entry may include, in a non-limiting example, one or more of a time stamp information (e.g., when an entry was added to ACQ DB 119, when the PLMN-RAT-frequency combination was identified, or the like), further identifying information for any of the RPLMN, RAT, or frequency in the entry, and/or any information related to acquiring service according to the PLMN-RAT-frequency combination.

In an aspect, ACQ DB scan module 116 may be configured to scan a first frequency associated with the most recent RAT and/or the RPLMN. For example, the most recent RAT may be the RAT the UE previously camped on prior to entering the OOS state. If ACQ DB scan module 116 determines that service was not acquired based on scanning the first frequency because, for example, the UE did not identify a signal on which service may be acquired associated with the first frequency associated with the most recent RAT/RPLMN, the ACQ DB scan module 116 may be configured to scan for a second frequency, still associated with the most recent RAT and/or /RPLMN. To do so, ACQ DB scan module 116 may, in an aspect, be configured to again refer to PLMN-RAT-frequency combination(s) 124 if more than one frequency for the most recent RAT and/or RPLMN were provided therein. In another aspect, ACQ DB scan module 116 may be configured to communicate with ACQ DB 119 to retrieve another PLMN-RAT-frequency combination 124 such that it may select a second frequency associated with the most recent RAT and/or RPLMN. ACQ DB Scan Module 116 may be configured to continue this process until it either identifies a signal on which service may be acquired, or it exhausts all frequencies of the most recent RAT and/or RPLMN.

Alternatively, in an aspect, upon completing scanning all frequencies paired with the first RAT and/or the RPLMN, if ACQ DB scan module 116 has not identified a signal on which service may be acquired, ACQ DB scan module 116 may be configured to communicate that it has not identified a signal on which service may be acquired to camping and registration module 112 as scan result 121.

In an aspect, UE 110 includes camping and registration module 112 configured to receive scan result 121 and attempt to register UE 110 with the RPLMN. If scan result 121 includes an indication that a signal on which service may be acquired was identified by ACQ DB scan module 116, camping and registration module 112 may be configured to camp on and attempt to register with the RPLMN. If scan result 121 includes an indication that ACQ DB scan module 116 completed scanning all frequencies for the most recent RAT associated with RPLMN, and no frequencies for camping are found, Camping & Registration module 112 may be configured to send a list of available PLMNs to the NAS when Scanning Module 115 determines that at least one frequency associated with the most recent RAT or RPLMN is not found during the scanning of the one or more frequencies of the most recent RAT based on the ACQ DB 119.

Additionally, Camping and registration module 112 may be configured to determine whether a home public land mobile network (HPLMN) is included within the list of all available PLMNs retrieved from available PLMN data store 113. If so, camping and registration module 112 may be configured to attempt to register with HPLMN. If such registration is successful, UE 110 acquires service and the processing described herein ends. If such registration is not successful and/or HPLMN is not included within the list of all available PLMNs, camping and registration module 112 may be configured to communicate a Registration failure indication 123 to scanning module 115. In an additional aspect, NAS may send a request to the UE to switch to a different RAT (e.g., second RAT) and to scan frequencies of the second RAT for service. For example, Scanning module 115 may be configured to switch the UE from one RAT (e.g., most recent RAT) to the second RAT as the UE is a multi-mode UE that is capable of supporting multiple RATs for acquiring service.

In an aspect, ACQ DB scan module 116 may also be configured to scan one or more frequencies of the second RAT based on the acquisition database. If ACQ DB scan module 116 determines that service was not acquired based on scanning the first frequency of the second RAT because, for example, the UE did not identify a signal on which service may be acquired associated with the first frequency associated with the second RAT (e.g., RAT2), the ACQ DB scan module 116 may be configured to scan for a second frequency associated with the second RAT. To do so, ACQ DB scan module 116 may, in an aspect, be configured to again refer to PLMN-RAT-frequency combination(s) 124 if more than one frequency for the second RAT were provided therein. ACQ DB Scan Module 116 may be configured to continue this process until it either identifies a signal on which service may be acquired, or it exhausts all frequencies of the second RAT.

In an aspect, scanning module 115 may be configured to receive Registration failure indication 123 from camping and registration module 112. In response, scanning module 115 may be configured to activate full band scan module 117 to begin performing full band scans, for example, of one or more frequencies, associated with the most recent RAT and/or RPLMN 130. To do so, full band scan module 117 may be configured to retrieve information related to frequencies associated with the most recent RAT and/or RPLMN 130.

In an aspect, Full band scan module 117 may be configured to scan frequencies of the full band associated with the most recent RAT and/or the RPLMN. If full band scan module 117 identifies a signal on which service may be acquired, it may be configured to communicate information related to the identified signal, including, for example, a corresponding frequency, RAT, PLMN, and/or other information, to camping and registration module 112 as scan result 121. In response, and as described herein, camping and registration module 112 may be configured to attempt to register with the RPLMN. If full band scan module 117 does not identify a signal on which service may be acquired associated with RPLMN, it may be configured to communicate that it has not identified a signal on which service may be acquired to camping and registration module 112 as scan result 121.

Additionally, in an aspect, Camping & Registration Module 112 may be configured to send a list of available PLMNs to the NAS when Full band scan module 117 determines that at least one frequency associated with the most recent RAT and/or RPLMN is not found during the full band scan of the one or more frequencies of the most recent RAT.

In an aspect, Camping and registration module 112 may be configured to determine whether a home public land mobile network (HPLMN) is included within the list of all available PLMNs retrieved from available PLMN data store 113. If so, camping and registration module 112 may be configured to attempt to register with HPLMN. If such registration is successful, UE 110 acquires service and the processing described herein ends. If such registration is not successful and/or HPLMN is not included within the list of all available PLMNs, camping and registration module 112 may be configured to communicate a Registration failure indication 123 to full band scan module 117. In an additional aspect, NAS may send a request to the UE to switch to a different RAT (e.g., second RAT) and to perform a full band scan of the second RAT for service. For example, Full band scan module 117 may be configured to switch the UE from the first RAT (e.g., most recent RAT) to the second RAT as the UE is a multi-mode UE that is capable of supporting multiple RATs for service.

In an aspect, Full band scan module 117 may be configured to scan one or more frequencies of the second RAT. If full band scan module 117 determines that service was not acquired based on scanning the first frequency of the second RAT because, for example, the UE did not identify a signal on which service may be acquired associated with the first frequency associated with the second RAT (e.g., RAT2), the full band scan module 117 may be configured to scan for a second frequency, still associated with the second RAT. In another aspect, full band scan module 117 may be configured to continue this process until it either identifies a signal on which service may be acquired, or it exhausts all frequencies of the second RAT.

In an aspect, where no signal on which service may be acquired has been found as a result of full band scan of the second RAT, camping and registration module 112, upon receiving such an indication as scan result 121, may be configured to end processing and allow the UE 110 to remain in the out-of-service state first identified by Service Determiner 111. In an aspect, UE 110 may be configured to attempt to acquire service again, after, for example, a particular amount of time has elapsed, channel quality has increased, the UE 110 has changed geographic locations, a user has so requested, and/or the like. In an aspect, this procedure may be repeated for all supportable RATs, and the UE may remain in an out-of-service state if the UE fails to acquire service.

In an aspect, some or all of the functions described with respect to Service Determiner 111, camping and registration module 112, and/or available PLMN data store 113, may be part of the NAS layer of UE 110. In an aspect, some or all of the functions described with respect to camping and registration module 112, available PLMN data store 113, scanning module 115, and/or ACQ DB 119 may be part of a lower layer radio resource, e.g., an RRC or RR layer, depending on the current RAT.

Figure 2:
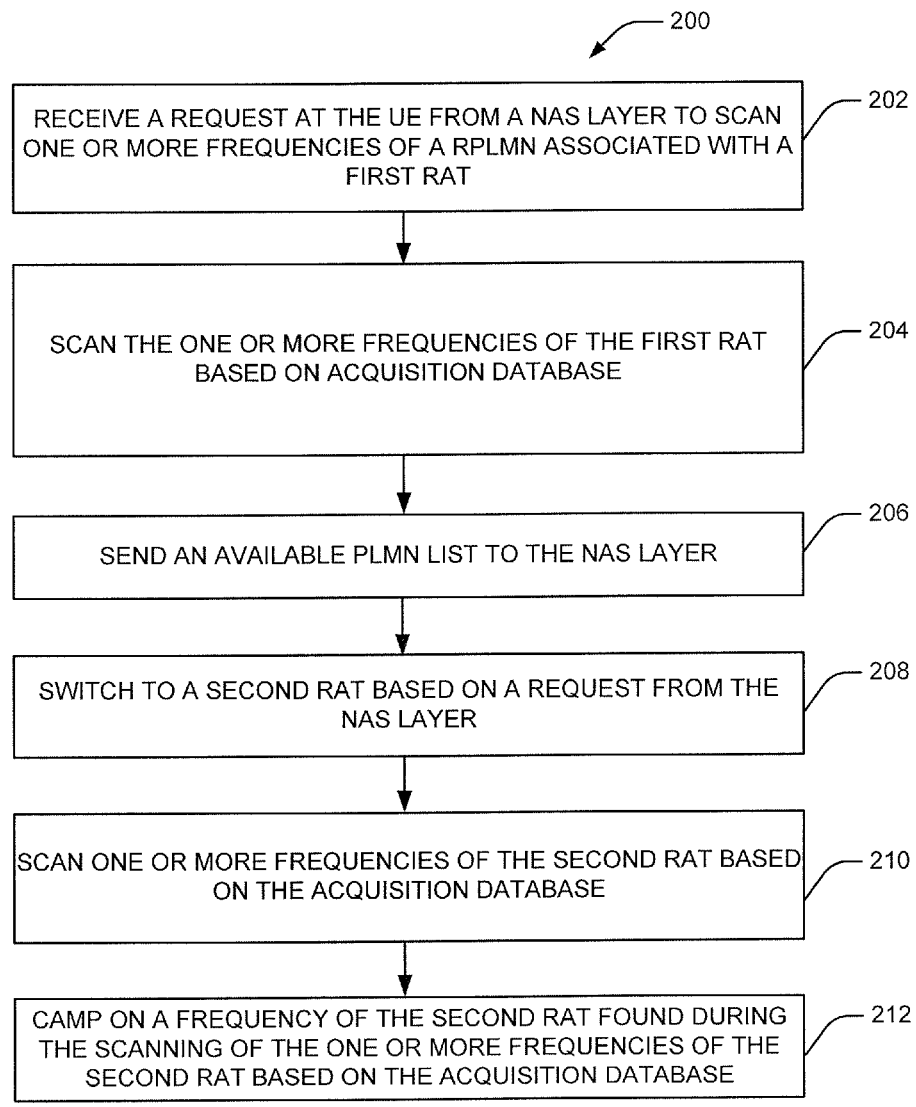
FIG. 2 is a flow chart illustrating a method for scanning for service at a multi-mode UE after being out-of-service, according to the described aspects.

Referring to FIG. 2, a method 200 may be performed by UE 110 of FIG. 1, for searching for service when a multi-mode user equipment (UE) goes out of service (OOS), according to the described aspects. In an aspect, Service Determiner 111, camping and registration module 112, available PLMN data store 113, scanning module 115—including ACQ DB scan module 116 and full band scan module 117—and/or ACQ DB 119, all of FIG. 1, may be configured to perform aspects of method 200.

At 202, method 200 includes receiving a request at the UE, from a non-access stratum (NAS) layer, to scan one or more frequencies of a registered public land mobile network (RPLMN) associated with a first radio access technology (RAT), wherein the first RAT is a last camped RAT of the UE. In an aspect, for example, Service Determiner 111 may be configured to receive a request to scan one or more frequencies of a RPLMN associated with a first RAT. For example, the request may be received by UE 110, e.g., at the AS layer, from a NAS layer of the UE. In an additional aspect, first RAT is the RAT the UE last camped on prior to going OOS. In an aspect, Service Determiner 111 may comprise hardware, software, and/or firmware, or some combination thereof and having an interface to receive the request from the NAS layer.

At 204, method 200 includes scanning the one or more frequencies of the first RAT based on an acquisition database (ACQ DB). In an aspect, for example, UE 110 may include ACQ DB scan module 116 that may scan for one or more frequencies, e.g., f1, retrieved from ACQ DB 119. In an aspect, ACQ DB scan module 116 may comprise hardware, software, and/or firmware, or some combination thereof to scan for frequencies and ACQ DB 119 may be a database that can store entries for various PLMN-RAT-frequency combinations 125.

In an additional aspect, ACQ DB scan module 116 may retrieve one or more PLMN-RAT-frequency combinations 124 from ACQ DB 119 for scanning. For example, in an aspect, ACQ DB scan module 116 may retrieve a PLMN-RAT-frequency combination associated with RPLMN, RAT 1 and/or f1 in the form of a response to a request or a query from ACQ DB scan module 116. In a further additional aspect, scanning module 115 may receive a no service or out of service indication 122, from Service Determiner 111, which may include information related to the RAT (e.g., f1) on which UE 110 was most recently camped, e.g., RPLMN 130.

At 206, method 200 includes sending an available PLMN list to the NAS layer in response to determining that the RPLMN (e.g., one or more frequencies associated with the RPLMN) is not found during the scanning of the first RAT based on the ACQ DB. In an aspect, for example, ACQ DB scan module 116 may fail to acquire service on a first frequency (e.g., f1) based on scanning the first frequency. In an additional aspect, camping and registration module 112 may send available PLMN list that may be stored in available PLMN data store 113 to the NAS layer after the ACQ DB scan module 116 determines that the RPLMN is not found during the scanning of the first RAT based on the ACQ DB.

At 208, method 200 includes switching to a second RAT based on a request from the NAS layer in response to identifying that a HPLMN is not available in the PLMN list. For example, in an aspect, scan module 115 may switch to a second RAT when HPLMN is not available in the PLMN list. The UE can search for service by switching between RATs as the UE is a multi-mode capable UE.

At 210, method 200 includes scanning one or more frequencies of the second RAT based on the acquisition database. For example, in an aspect, ACQ DB scan module 116 may scan for one or more frequencies, e.g., f4, retrieved from ACQ DB 119. For example, ACQ DB scan module 116 may retrieve one or more PLMN-RAT-frequency combinations 124 from ACQ DB 119 for scanning. For example, in an aspect, ACQ DB scan module 116 may retrieve a PLMN-RAT-frequency combination associated with PLMN #1, RAT 1 and/or f4 in the form of a response to a request or a query from ACQ DB scan module 116. In an aspect, as described above, ACQ DB scan module 116 may comprise hardware, software, and/or firmware, or some combination thereof to scan for frequencies and ACQ DB 119 may be a database that can store entries for various PLMN-RAT-frequency combinations 125.

At 212, method 200 includes camping on a frequency of the second RAT found during the scanning of the one or more frequencies of the second RAT based on the ACQ DB. In an aspect, for example, UE 110 may include a camping & registration module 112 that may allow the UE to camp on the frequency of the second RAT (e.g., f4) found during the scanning of the frequencies of the second RAT. The camping of the UE allows the UE to recover from an OOS state and provide service to a subscriber associated with the UE.

In an alternate or additional aspect, UE 110 may include attempting to acquire service again, after, for example, a particular amount of time has elapsed, channel quality has increased, the UE 110 has changed geographic locations, a user has so requested, and/or the like. For example, in an aspect, UE may include scanning module 115, ACQ DB scan module 116, and/or full band scan module 117 that may attempt to acquire service after a particular amount of time has elapsed or channel quality has increased, etc.

Figure 3:
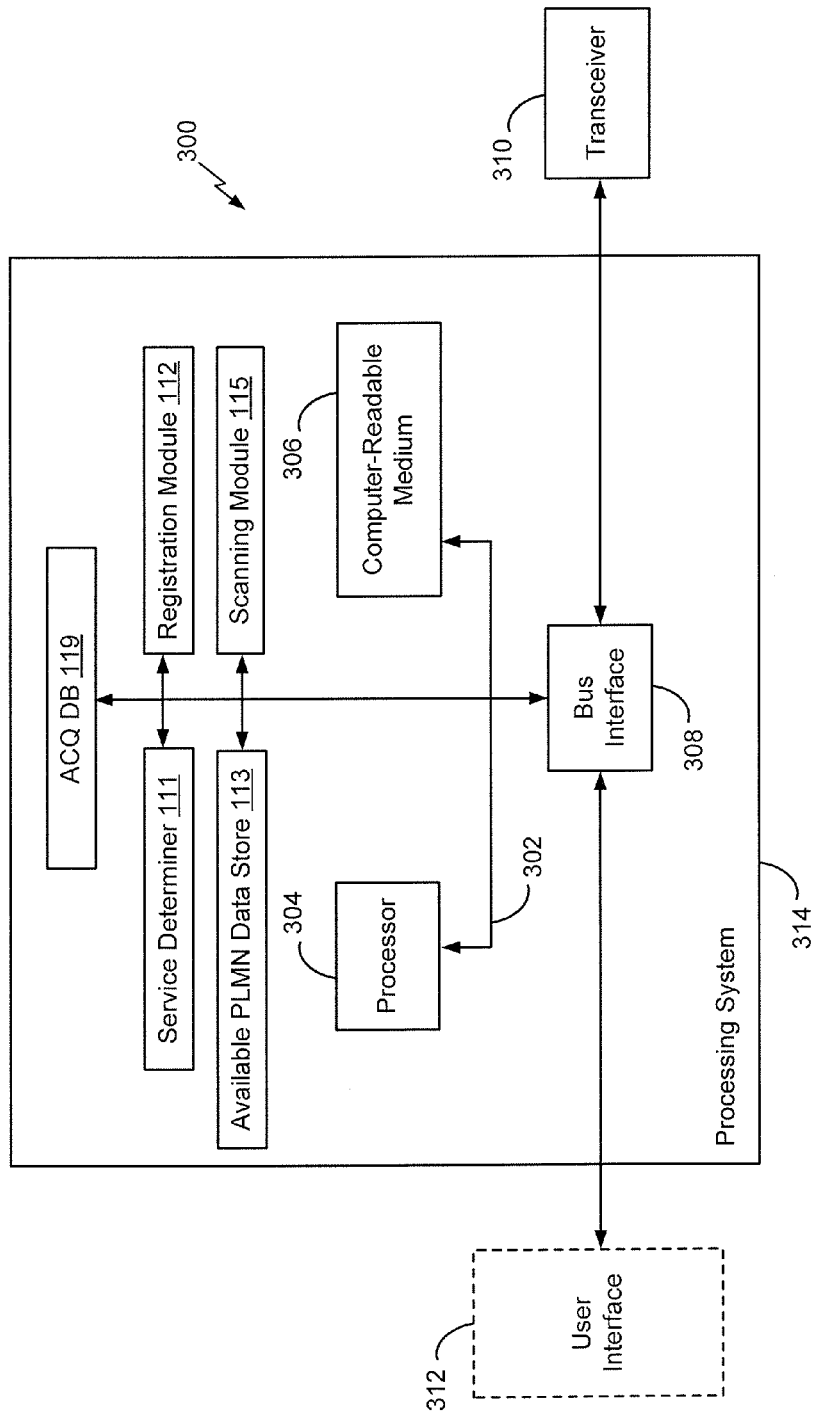
FIG. 3 is a block diagram illustrating an example of a hardware implementation for an apparatus employing a processing system to perform the functions described herein.

FIG. 3 is a block diagram illustrating an example of a hardware implementation for an apparatus 300, which may be included within or which may be UE 110 of FIG. 1, employing a processing system 314 for performing the functions for searching for service when a multi-mode user equipment (UE) goes out of service (OOS) as described herein. In an aspect, for example, processing system 314 may include Service Determiner 111, camping and registration module 112, available PLMN data store 113, scanning module 115, and/or ACQ DB 119, as described herein with respect to FIGS. 1 and 2. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 also links together various circuits that may perform the functions of Service Determiner 111, camping and registration module 112, available PLMN data store 113, scanning module 115, and/or ACQ DB 119. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus, such as, for example, UE 110. The computer-readable medium 306 may also be used for storing data including, for example, a list of available PLMNs and/or PLMN-RAT-frequency combinations, which is manipulated by the processor 304 when executing software.

The various concepts presented throughout this disclosure may be implemented across a broad variety of telecommunication systems, network architectures, and communication standards.

Figure 4:
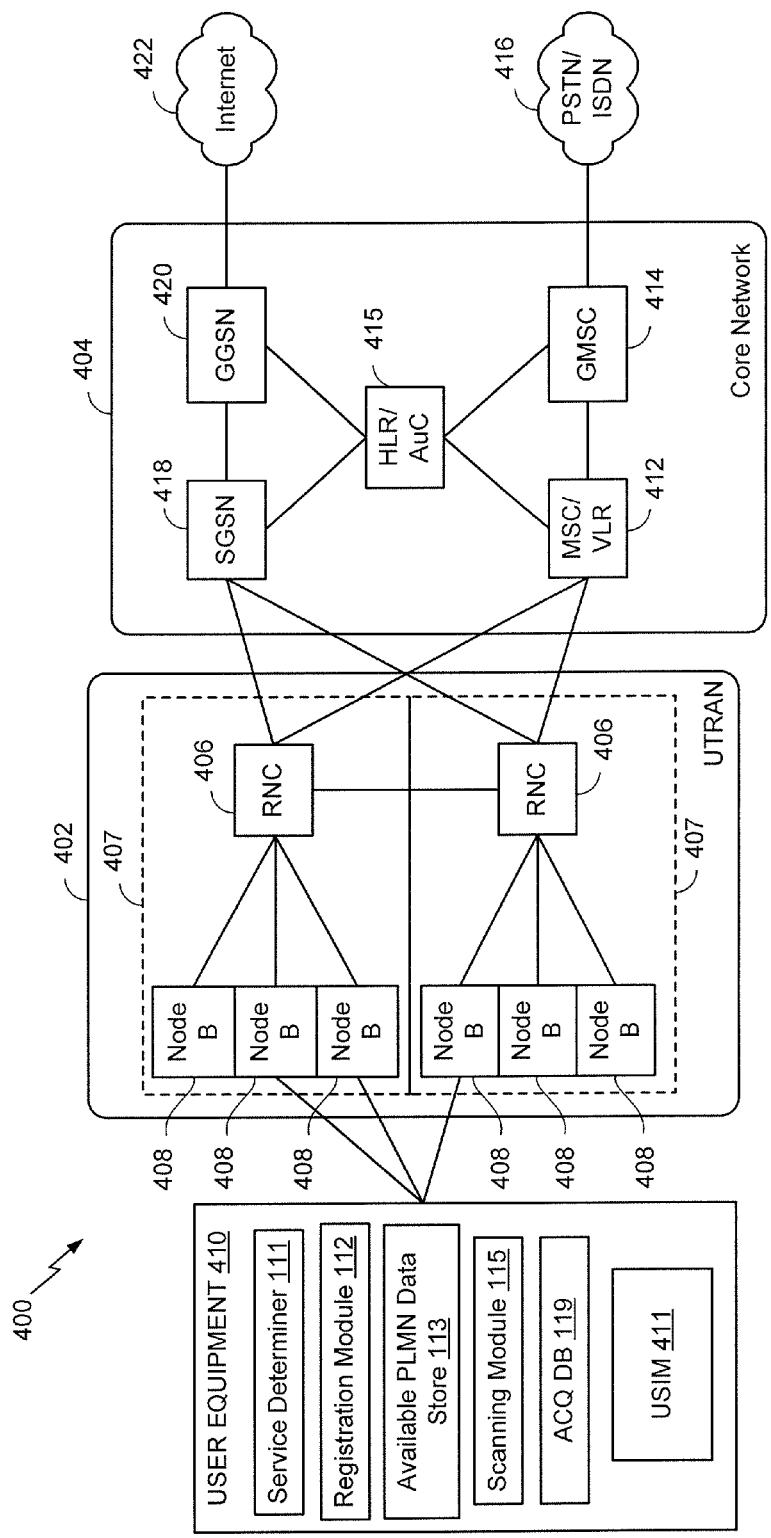
FIG. 4 is a block diagram illustrating an example of a telecommunications system including a multi-mode UE configured to scan for service after being out-of-service, according to the described aspects.

Referring to FIG. 4, by way of example and without limitation, the aspects of the present disclosure are presented with reference to a UMTS system 400 employing a W-CDMA air interface, in which UE 110 of FIG. 1 may operate. A UMTS network includes three interacting domains: a Core Network (CN) 404, a UMTS Terrestrial Radio Access Network (UTRAN) 402, and User Equipment (UE) 410. In an aspect, UE 410 may be UE 110 of FIG. 1, and include Service Determiner 111, camping and registration module 112, available PLMN data store 113, scanning module 114, and ACQ DB 119, as described above with reference to FIGS. 1 and 2.

In this example, the UTRAN 402 provides various wireless services including telephony, video, data, messaging, broadcasts, and/or other services. The UTRAN 402 may include a plurality of Radio Network Subsystems (RNSs) such as an RNS 407, each controlled by a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Node B 408 may be base station 132 and/or base station 142 of FIG. 1. Further, communication between UE 410 and RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 24.331 incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 408 are shown in each RNS 407; however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The DL, also called the forward link, refers to the communication link from a Node B 408 to a UE 410, and the UL, also called the reverse link, refers to the communication link from a UE 410 to a Node B 408.

The CN 404 interfaces with one or more access networks, such as the UTRAN 402. As shown, the CN 404 is a GSM core network. However, as those skilled in the art will recognize, the various concepts presented throughout this disclosure may be implemented in a RAN, or other suitable access network, to provide UEs with access to types of CNs other than GSM networks.

The CN 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a VLR that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 414 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 414 to determine the UE's location and forwards the call to the particular MSC serving that location.

The CN 404 also supports packet-data services with a serving GPRS support Node (SGSN) 418 and a gateway GPRS support Node (GGSN) 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 408 and a UE 410. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 410 provides feedback to the Node B 408 over the HS-DPCCH to indicate whether it correctly decoded a packet on the downlink.

HS-DPCCH further includes feedback signaling from the UE 410 to assist the Node B 408 in taking the right decision in terms of modulation and coding scheme and precoding weight selection, this feedback signaling including the CQI and PCI.

"HSPA Evolved" or HSPA+ is an evolution of the HSPA standard that includes MIMO and 65-QAM, enabling increased throughput and higher performance. That is, in an aspect of the disclosure, the Node B 408 and/or the UE 410 may have multiple antennas supporting MIMO technology. The use of MIMO technology enables the Node B 408 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 410 to increase the data rate or to multiple UEs 410 to increase the overall system capacity. This is achieved by spatially precoding each data stream and then transmitting each spatially precoded stream through a different transmit antenna on the downlink. The spatially precoded data streams arrive at the UE(s) 410 with different spatial signatures, which enables each of the UE(s) 410 to recover the one or more the data streams destined for that UE 410. On the uplink, each UE 410 may transmit one or more spatially precoded data streams, which enables the Node B 408 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 5:
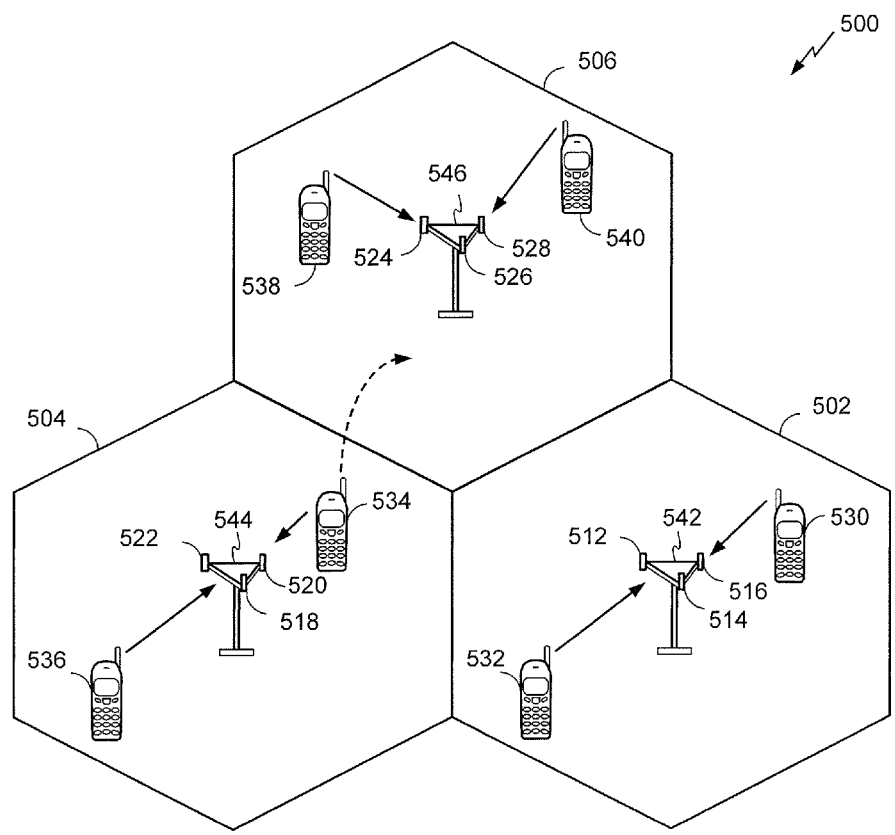
FIG. 5 is a block diagram illustrating an example of an access network including a multi-mode UE configured to scan for service after being out-of-service, according to the described aspects.

Referring to FIG. 5, an access network 500, in which UE 110 of FIG. 1 may operate, in UTRAN architecture is illustrated. For example, in an aspect, one of more of UEs 530, 532, 534, 536, 538, and/or 540 may be the same as or similar to UE 110 of FIG. 1, for instance, configured to include Service Determiner 111, camping and registration module 112, available PLMN data store 113, scanning module 115, and ACQ DB 119, as described above with reference to FIGS. 1 and 2. The multiple access wireless communication system includes multiple cellular regions (cells), including cells 502, 504, and/or 506, each of which may include one or more sectors.

The multiple sectors can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 each correspond to a different sector. In cell 504, antenna groups 524, 526, and 528 each correspond to a different sector. The cells 502, 504 and 506 may include several wireless communication devices, e.g., User Equipment or UEs, which may be in communication with one or more sectors of each cell 502, 504 or 506. For example, UEs 530 and 532 may be in communication with Node B 542, UEs 534 and 536 may be in communication with Node B 544, and UEs 538 and 540 can be in communication with Node B 546. Here, each Node B 542, 544, 546 is configured to provide an access point to a CN 404 (see FIG. 4) for all the UEs 530, 532, 534, 536, 538, 540 in the respective cells 502, 504, and 506. In an aspect, UEs 530, 532, 534, 536, 538, and/or 540 may be UE 110 of FIG. 1, and Node Bs 542, 544, and/or 546 may be base station 132 and/or base station 142 of FIG. 1.

As the UE 534 moves from the illustrated location in cell 504 into cell 506, a serving cell change (SCC) or handover may occur in which communication with the UE 534 transitions from the cell 504, which may be referred to as the source cell, to cell 506, which may be referred to as the target cell. Management of the handover procedure may take place at the UE 534, at the Node Bs corresponding to the respective cells, at a radio network controller 406 (see FIG. 4), or at another suitable Node in the wireless network. For example, during a call with the source cell 504, or at any other time, the UE 534 may monitor various parameters of the source cell 504 as well as various parameters of neighboring cells such as cells 506 and 502. Further, depending on the quality of these parameters, the UE 534 may maintain communication with one or more of the neighboring cells. During this time, the UE 534 may maintain an Active Set, that is, a list of cells that the UE 534 is simultaneously connected to (i.e., the UTRA cells that are currently assigning a downlink dedicated physical channel DPCH or fractional downlink dedicated physical channel F-DPCH to the UE 534 may constitute the Active Set).

The modulation and multiple access scheme employed by the access network 500 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 5.

Figure 6:
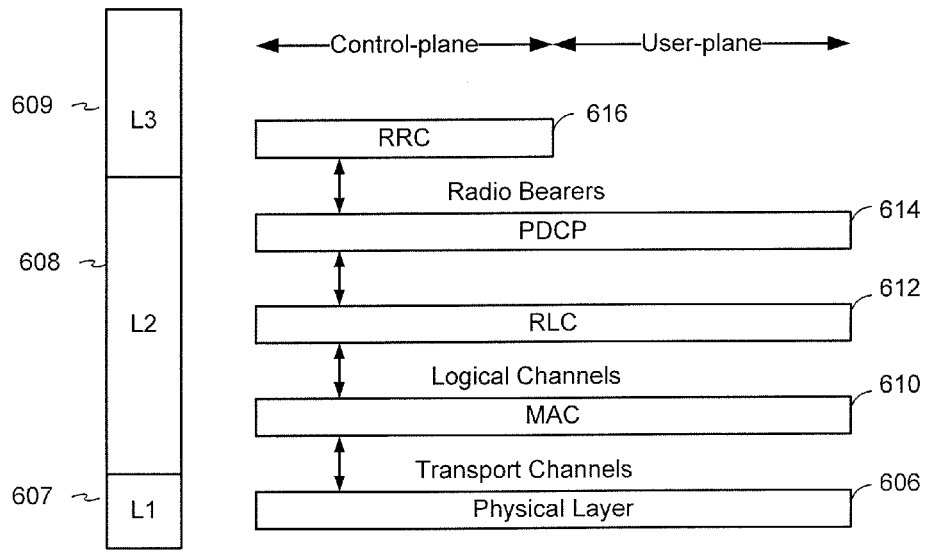
FIG. 6 is a block diagram illustrating an example of a radio protocol architecture for user and control planes which may be used by a multi-mode UE configured to scan for service after being out-of-service, according to the described aspects.

Referring to FIG. 6, an example radio protocol architecture 600 relates to the user plane 602 and the control plane 604 of a user equipment (UE), such as UE 110 of FIG. 1, and/or a Node B/base station, such as base station 132 and/or base station 142 of FIG. 1. For example, in an aspect, one or more of the components of UE 110, such as the Service Determiner 111, camping and registration module 112, available PLMN data store 113, scanning module 115, and ACQ DB 119, as described above with reference to FIGS. 1 and 2, may be implemented in one or more layers of radio protocol architecture 600. The radio protocol architecture 600 for the UE and Node B is shown with three layers: Layer 1 607, Layer 2 608, and Layer 3 609. Layer 1 607 is the lowest lower and implements various physical layer signal processing functions. As such, Layer 1 607 includes the physical layer 606. Layer 2 (L2 layer) 608 is above the physical layer 606 and is responsible for the link between the UE and Node B over the physical layer 606. Layer 3 (L3 layer) 609 includes a radio resource control (RRC) sublayer 616. The RRC sublayer 616 handles the control plane signaling of Layer 3 between the UE and the UTRAN.

In the user plane, the L2 layer 608 includes a media access control (MAC) sublayer 610, a radio link control (RLC) sublayer 612, and a packet data convergence protocol (PDCP) 614 sublayer, which are terminated at the Node B on the network side. Although not shown, the UE may have several upper layers above the L2 layer 608 including a network layer (e.g., IP layer) that is terminated at a PDN gateway on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between Node Bs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

Figure 7:
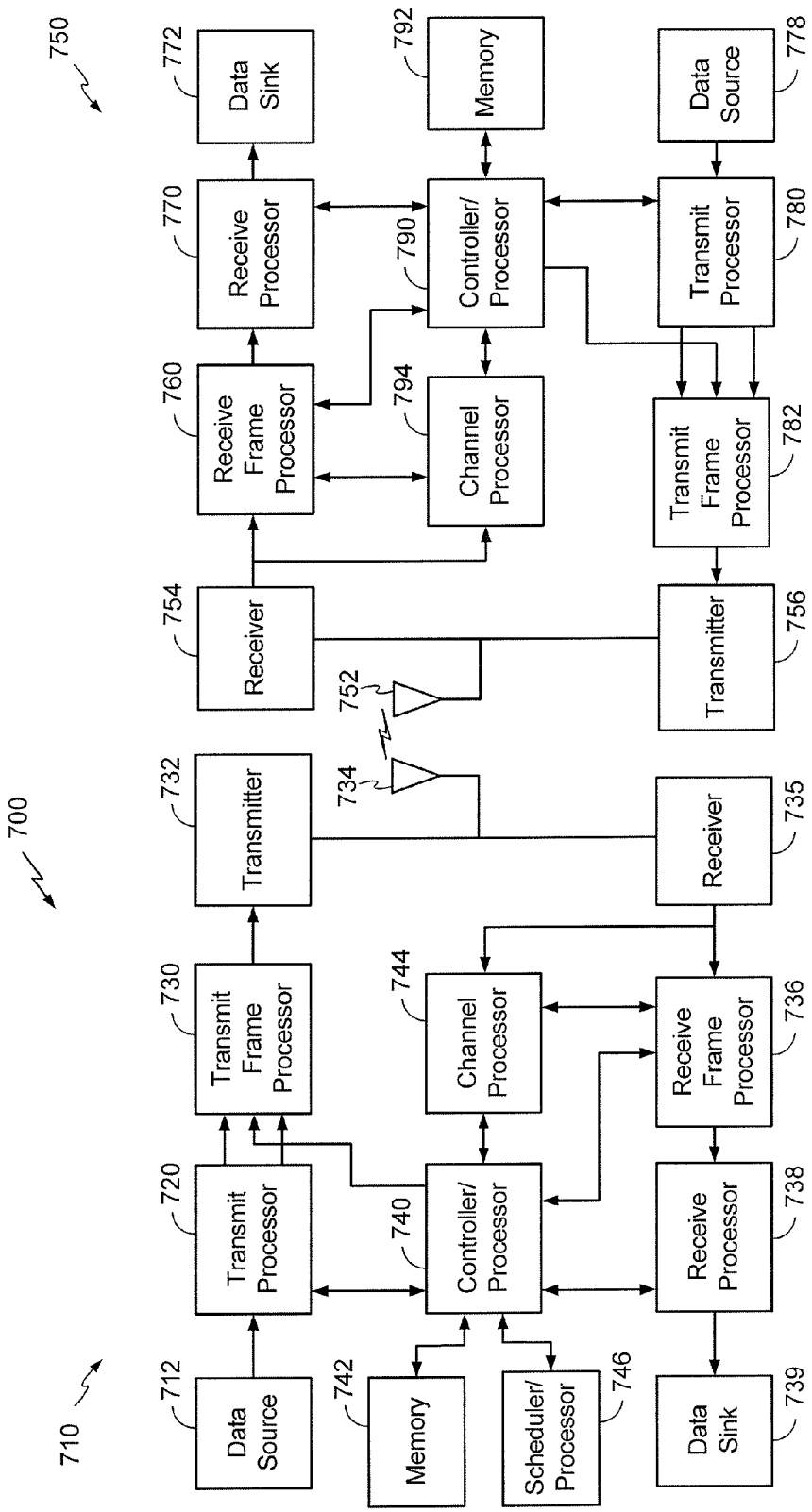
FIG. 7 is a block diagram conceptually illustrating an example of a Node B in communication with a multi-mode UE in a telecommunications system, where the UE may be configured to scan for service after being out-of-service, according to the described aspects.

FIG. 7 is a block diagram of a Node B 710 in communication with a UE 750, where UE 750 may be UE 110 of FIG. 1 and/or UE 410 of FIG. 4, and Node B 710 may be base station 132 and/or base station 142 of FIG. 1 and/or Node B 408 of FIG. 4. Although not illustrated in FIG. 7, UE 750 may be configured similar to UE 110 of FIG. 1 and/or UE 410 of FIG. 4, e.g., configured to include Service Determiner 111, camping and registration module 112, available PLMN data store 113, scanning module 115, and ACQ DB 119, as described above with reference to FIGS. 1 and 2. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 777 and control signals from the controller/processor 790 are provided to a transmit processor 770. The data source 777 may represent applications running in the UE 750 and various user interfaces (e.g., keyboard). Similar to the functionality described in connection with the downlink transmission by the Node B 710, the transmit processor 770 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 770 will be provided to a transmit frame processor 772 to create a frame structure. The transmit frame processor 772 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 737. The receive processor 737 performs the inverse of the processing performed by the transmit processor 770 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network." are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for searching for service when a multi-mode user equipment (UE) goes out of service (OOS), comprising:
receiving a request at the UE, from a non-access stratum (NAS) layer, to scan one or more frequencies of a registered public land mobile network (RPLMN) associated with a first radio access technology (RAT), wherein the first RAT is a last camped RAT of the UE;
scanning the one or more frequencies of the first RAT based on an acquisition database (ACQ DB);
sending an available PLMN list to the NAS layer in response to determining that the RPLMN is not found during the scanning of the first RAT based on the ACQ DB;
switching to a second RAT based on a request from the NAS layer in response to identifying that a Home PLMN (HPLMN) is not in the available PLMN list;
scanning one or more frequencies of the second RAT based on the acquisition database (ACQ DB); and camping on a frequency of the second RAT found during the scanning of the one or more frequencies of the second RAT based on the ACQ DB.

2. The method of claim 1, further comprising:
receiving a request, from the NAS layer, to perform a full band scan of the first RAT when the UE does not find service based on the scanning of the first RAT and the second RAT based on the ACQ DB; and
camping on a RPLMN when the RPLMN is found during the full band scan of the first RAT.

3. The method of claim 2, further comprising:
sending an available PLMN list to the NAS layer in response to determining that the RPLMN is not found during the full band scan of the first RAT; and
camping on a HPLMN when the HPLMN is present in the available PLMN list.

4. The method of claim 2, further comprising:
sending an available PLMN list to the NAS layer in response to determining that the RPLMN is not found during the full band scan of the first RAT;
switching to the second RAT based on a request from the NAS layer in response to identifying that the Home PLMN is not in the available PLMN list;
performing a full band scan of the second RAT; and
camping on a frequency of the second RAT found during the full band scan of the second RAT.

5. The method of claim 1, further comprising:
camping on the RPLMN when the UE finds the RPLMN during the scanning of the first RAT based on the ACQ DB.

6. The method of claim 1, further comprising:
camping on the HPLMN when the HPLMN is present in the available PLMN list.

7. The method of claim 1, wherein the first RAT is Universal Mobile Telecommunications System (UMTS) and the second RAT is Long Term Evolution (LTE).

8. The method of claim 1, wherein the ACQ DB comprises a plurality of frequencies corresponding to the first RAT and the second RAT.

9. The method of claim 1, wherein the scanning of the first RAT based on the acquisition database (ACQ DB) comprises:
scanning a first frequency of a plurality of frequencies of the first RAT stored in the ACQ DB;
determining that service was not acquired based on the scanning of the first frequency;
scanning one or more second frequencies from the plurality of frequencies stored in the ACQ DB.

10. An apparatus for searching for service when a multi-mode user equipment (UE) goes out of service (OOS), comprising:
means for receiving a request at the UE, from a non-access stratum (NAS) layer, to scan one or more frequencies of a registered public land mobile network (RPLMN) associated with a first radio access technology (RAT), wherein the first RAT is a last camped RAT of the UE;
means for scanning the one or more frequencies of the first RAT based on an acquisition database (ACQ DB);
means for sending an available PLMN list to the NAS layer in response to determining that the RPLMN is not found during the scanning of the first RAT based on the ACQ DB;
means for switching to a second RAT based on a request from the NAS layer in response to identifying that a Home PLMN (HPLMN) is not in the available PLMN list;
means for scanning one or more frequencies of the second RAT based on the acquisition database (ACQ DB); and
means for camping on a frequency of the second RAT found during the scanning of the one or more frequencies of the second RAT based on the ACQ DB.

11. The apparatus of claim 10, further comprising:
means for receiving a request, from the NAS layer, to perform a full band scan of the first RAT when the UE does not find service based on the scanning of the first RAT and the second RAT based on the ACQ DB; and
means for camping on a RPLMN when the RPLMN is found during the full band scan of the first RAT.

12. The apparatus of claim 11, further comprising:
means for sending an available PLMN list to the NAS layer in response to determining that the RPLMN is not found during the full band scan of the first RAT; and
means for camping on a HPLMN when the HPLMN is present in the available PLMN list.

13. The apparatus of claim 11, further comprising:
means for sending an available PLMN list to the NAS layer in response to determining that the RPLMN is not found during the full band scan of the first RAT;
means for switching to the second RAT based on a request from the NAS layer in response to identifying that the Home PLMN is not in the available PLMN list;
means for performing a full band scan of the second RAT; and
means for camping on a frequency of the second RAT found during the full band scan of the second RAT.

14. The apparatus of claim 10, further comprising:
means for camping on the RPLMN when the UE finds the RPLMN during the scanning of the first RAT based on the ACQ DB.

15. The apparatus of claim 10, further comprising:
means for camping on the HPLMN when the HPLMN is present in the available PLMN list.

16. The apparatus of claim 10, wherein the first RAT is Universal Mobile Telecommunications System (UMTS) and the second RAT is Long Term Evolution (LTE).

17. The apparatus of claim 10, wherein the ACQ DB comprises a plurality of frequencies corresponding to the first RAT and the second RAT.

18. The apparatus of claim 10, wherein the means for scanning of the first RAT based on the acquisition database (ACQ DB) further comprises:
means for scanning a first frequency of a plurality of frequencies of the first RAT stored in the ACQ DB;
determining that service was not acquired based on the scanning of the first frequency;
scanning one or more second frequencies from the plurality of frequencies stored in the ACQ DB.

19. A non-transitory computer readable medium for searching for service when a multi-mode user equipment (UE) goes out of service (OOS) comprising code that, when executed by a processor or processing system included within a user equipment, causes the user equipment to:
receive a request at the UE, from a non-access stratum (NAS) layer, to scan one or more frequencies of a registered public land mobile network (RPLMN) associated with a first radio access technology (RAT), wherein the first RAT is a last camped RAT of the UE;
scan the one or more frequencies of the first RAT based on an acquisition database (ACQ DB);
send an available PLMN list to the NAS layer in response to determining that the RPLMN is not found during the scanning of the first RAT based on the ACQ DB;
switch to a second RAT based on a request from the NAS layer in response to identifying that a Home PLMN (HPLMN) is not in the available PLMN list;

scan one or more frequencies of the second RAT based on the acquisition database (ACQ DB); and camp on a frequency of the second RAT found during the scanning of the one or more frequencies of the second RAT based on the ACQ DB.

20. The computer readable medium of claim 19, further comprising code to:

receive a request, from the NAS layer, to perform a full band scan of the first RAT when the UE does not find service based on the scanning of the first RAT and the second RAT based on the ACQ DB; and camp on a RPLMN when the RPLMN is found during the full band scan of the first RAT.

21. The computer readable medium of claim 20, further comprising code to:

send an available PLMN list to the NAS layer in response to determining that the RPLMN is not found during the full band scan of the first RAT; and camp on a HPLMN when the HPLMN is present in the available PLMN list.

22. The computer readable medium of claim 20, further comprising code to:

send an available PLMN list to the NAS layer in response to determining that the RPLMN is not found during the full band scan of the first RAT;

switch to the second RAT based on a request from the NAS layer in response to identifying that the Home PLMN is not in the available PLMN list;

perform a full band scan of the second RAT; and camp on a frequency of the second RAT found during the full band scan of the second RAT.

23. The computer readable medium of claim 19, further comprising code to:

camp on the RPLMN when the UE finds the RPLMN during the scanning of the first RAT based on the ACQ DB.

24. The computer readable medium of claim 19, further comprising code to:

camp on the HPLMN when the HPLMN is present in the available PLMN list.

25. The computer readable medium of claim 19, wherein the first RAT is Universal Mobile Telecommunications System (UMTS) and the second RAT is Long Term Evolution (LTE).

26. The computer readable medium of claim 19, wherein the ACQ DB comprises a plurality of frequencies corresponding to the first RAT and the second RAT.

27. An apparatus for searching for service when a multimode user equipment (UE) goes out of service (OOS), comprising:

a service determiner module configured to receive a request at the UE, from a non-access stratum (NAS) layer, to scan one or more frequencies of a registered public land mobile network (RPLMN) associated with a first radio access technology (RAT), wherein the first RAT is a last camped RAT of the UE;

a scanning module configured to scan the one or more frequencies of the first RAT based on an acquisition database (ACQ DB);

a camping and registration module to send an available PLMN list to the NAS layer in response to determining that the RPLMN is not found during the scanning of the first RAT based on the ACQ DB;

the scanning module further configured to switch the UE to a second RAT based on a request from the NAS layer in response to identifying that a Home PLMN (HPLMN) is not in the available PLMN list;

the scanning module further configured to scan one or more frequencies of the second RAT based on the acquisition database (ACQ DB); and the camping and registration module further configured to camp on a frequency of the second RAT found during the scanning of the one or more frequencies of the second RAT based on the ACQ DB.

28. The apparatus of claim 27, further comprising:

the scanning module further configured to receive a request, from the NAS layer, to perform a full band scan of the first RAT when the UE does not find service based on the scanning of the first RAT and the second RAT based on the ACQ DB; and the camping and registration module to camp on a RPLMN when the RPLMN is found during the full band scan of the first RAT.

29. The apparatus of claim 28, further comprising:

the camping and registration module further configured to send an available PLMN list to the NAS layer in response to determining that the RPLMN is not found during the full band scan of the first RAT; and the camping and registration module further configured to camp on a HPLMN when the HPLMN is present in the available PLMN list.

30. The apparatus of claim 28, further comprising:

the camping and registration module further configured to send an available PLMN list to the NAS layer in response to determining that the RPLMN is not found during the full band scan of the first RAT;

the scanning module further configured to switch the UE to the second RAT based on a request from the NAS layer in response to identifying that the Home PLMN is not in the available PLMN list;

the scanning module further configured to perform a full band scan of the second RAT; and the camping and registration module further configured to camp the UE on a frequency of the second RAT found during the full band scan of the second RAT.

* * * * *